US009172539B2

(12) United States Patent
Tanner et al.

(10) Patent No.: US 9,172,539 B2
(45) Date of Patent: Oct. 27, 2015

(54) IN-MARKET PERSONALIZATION OF PAYMENT DEVICES

(75) Inventors: Colin Tanner, Middlesex (GB); Paul Michael Evans, Hampshire (GB); Theresa L. Smith, England (GB)

(73) Assignee: MasterCard International Incorporated, Purchase, NY (US)

( * ) Notice: Subject to any disclaimer, the term of this patent is extended or adjusted under 35 U.S.C. 154(b) by 1055 days.

(21) Appl. No.: 13/268,155

(22) Filed: Oct. 7, 2011

(65) Prior Publication Data
US 2013/0067216 A1  Mar. 14, 2013

Related U.S. Application Data

(60) Provisional application No. 61/534,599, filed on Sep. 14, 2011.

(51) Int. Cl.
H04L 29/06    (2006.01)
H04L 9/32     (2006.01)
G06Q 20/34    (2012.01)

(52) U.S. Cl.
CPC .......... *H04L 9/3234* (2013.01); *G06Q 20/3552* (2013.01); *H04L 2209/56* (2013.01)

(58) Field of Classification Search
USPC .......................................................... 713/155
See application file for complete search history.

(56) References Cited

U.S. PATENT DOCUMENTS

| | | | | |
|---|---|---|---|---|
| 7,117,364 | B1 * | 10/2006 | Hepper et al. | 713/176 |
| 7,228,155 | B2 * | 6/2007 | Saunders | 455/558 |
| 7,527,208 | B2 * | 5/2009 | Hammad et al. | 235/492 |
| 8,302,171 | B2 * | 10/2012 | Le Saint | 726/5 |
| 2002/0193129 | A1 * | 12/2002 | Michaels et al. | 455/466 |
| 2002/0199027 | A1 * | 12/2002 | Huber | 709/310 |
| 2005/0156026 | A1 * | 7/2005 | Ghosh et al. | 235/380 |
| 2005/0246546 | A1 * | 11/2005 | Takagi et al. | 713/182 |
| 2006/0165060 | A1 * | 7/2006 | Dua | 370/352 |
| 2006/0196931 | A1 * | 9/2006 | Holtmanns et al. | 235/380 |
| 2008/0073426 | A1 * | 3/2008 | Koh et al. | 235/380 |
| 2009/0070691 | A1 * | 3/2009 | Jain | 715/760 |
| 2009/0185687 | A1 * | 7/2009 | Wankmueller et al. | 380/277 |
| 2010/0041368 | A1 * | 2/2010 | Kumar | 455/407 |
| 2010/0044433 | A1 * | 2/2010 | Wankmueller et al. | 235/381 |

OTHER PUBLICATIONS

Nordlund, Sirpa. "Secure Over-The-Air Services in NFC Ecosystems." retrieved from the internet at: http://www.nfc-research.at/fileadmincongress/pdf/05-Venyon-Sirpa-Nordlund.pdf 26 (2007).*

* cited by examiner

*Primary Examiner* — Harris C Wang
(74) *Attorney, Agent, or Firm* — Buckley, Maschoff & Talwalkar LLC

(57) ABSTRACT

Systems and methods for remotely personalizing payment devices for consumers are described. In an embodiment, a system includes a MOTAPS server computer that provides data preparation functions and a trusted service provider (TSP) personalization server computer. The system also includes a service provider computer operably coupled to the TSP personalization server computer, and a remote personalization device (RPD) operably coupled to the service provider computer. The RPD transmits personalization requests, receives personalization data, and personalizes a payment device before providing the personalized payment device to a consumer.

16 Claims, 8 Drawing Sheets

IN-MARKET PERSONALIZATION OF PAYMENT DEVICES

CROSS REFERENCE TO RELATED APPLICATION

The present application is based on, and claims benefit and priority of, U.S. Provisional Patent Application Ser. No. 61/534,599 filed on Sep. 14, 2011, the contents of which are incorporated herein in their entirety for all purposes.

BACKGROUND

Payment cards such as credit or debit cards are ubiquitous and have been used by consumers for decades. Such cards typically include a magnetic stripe on which the relevant account number is stored. To consummate a purchase transaction with such a card, the card is swiped through a magnetic stripe reader that is typically connected to a point of sale (POS) terminal. The reader reads the account number from the magnetic stripe, and the account number is used to route a transaction authorization request that is initiated by the POS terminal.

In pursuit of greater convenience and more rapid transactions at POS terminals, payment cards have more recently been developed that allow the account number to be automatically read from the card by radio frequency communication between the card and a "proximity reader" which may be incorporated with the POS terminal. These cards are often referred to as "proximity payment cards" or "contactless payment cards" or "chip cards", and include a radio frequency identification (RFID) integrated circuit (an "IC", often referred to as a "chip") embedded in the card body. A suitable antenna may also be embedded in the card body and if so, is connected to the RFID chip to allow the chip to receive and transmit data by RF communication via the antenna. In typical arrangements, the RFID chip is powered from an interrogation signal that is transmitted by the proximity reader and received by the card antenna. MasterCard International Incorporated, the assignee hereof, has established a widely-used standard, known as "PayPass™", for interoperability of proximity payment cards and proximity readers.

The capabilities of a contactless payment card have recently been incorporated into a mobile telephone, thereby turning the mobile telephone into a contactless payment device. The payment card account number and other account-specific or device-specific information is loaded into the mobile telephone by a process typically referred to as "personalization". Since mobile telephones come in many sizes and shapes, these mobile devices cannot be readily subjected to the same kind of automated personalization process that contactless payment cards typically undergo. Logistical problems also arise concerning transporting a mobile telephone or other contactless payment device to a personalization facility either after the user has purchased the mobile phone, or before placing the mobile phone in a typical mobile telephone distribution channel. Thus, for mobile telephones that are already in a distribution channel and/or already in the user's possession, in some markets "over the air" (OTA) data communications are utilized to personalize the mobile telephone by data communication via the mobile telephone network in which the phone operates. Such OTA personalization processes facilitate the offering of personalization services to the mobile sector.

The inventor recognized that there is a need for an in-market personalization system similar to that provided for mobile telephones for personalizing cards and non-card form factor (NCFF) devices for consumers. Such NCFF devices may include, for example, PayPass™ tickets, stickers, key fobs, wristwatches, wrist bands and the like, that may include an IC so that such devices can be used as payment devices. In particular, a need exists for providing convenient and easy to use personalization services to new markets currently considering the introduction of contact or contactless payments that will require the ability to instantly issue payment cards and NCFF payment devices to consumers.

DETAILED DESCRIPTION

In general, and for the purpose of introducing concepts of embodiments of the present invention, systems, methods and apparatus are described for providing a remote personalization process for payment devices such as contact payment cards, proximity payment cards and non-card form factor (NCFF) proximity devices (such as PayPass™ tickets, stickers, key fobs, wristwatches, wrist bands and the like). Unlike mobile telephones (or cell phones) containing proximity payment circuitry that can be personalized over-the-air (wirelessly), card and NCFF proximity payment devices require a Remote Personalization Device (RPD) to undertake the personalization process because the personalization data is generated centrally and/or remotely by a host system. Such an RPD could, in some embodiments, also be utilized to personalize payment cards that support a device that connects to the payment reader by a contact plate, as described in the EMV and ISO/IEC 7816 specifications. In addition, in some implementations a trusted service manager (TSM) or a trusted service provider (TSP) is needed to assume an extended role by providing additional functionality for controlling and managing the remote personalization devices (RPDs). Methods and apparatus are also described herein to ensure a secure platform for undertaking the required data preparation, data transmission, and data loading functionality for the payment devices.

For example, a payment device can be issued to a consumer and personalized by an RPD that may be situated in various locations (such as in retail stores, at concert events, at festival events, at other types of events, at ballparks, in campus environments such as universities and prisons, in companies, in government buildings, at night clubs, at hotels and resorts, at theme parks, at transit system entry locations (such as train stations), and the like) such that the payment device is ready for immediate use by the consumer. Such RPD's may be provided in what may be considered to be "unsecure" locations, and may take the form of, for example, attended desktop computers, unattended kiosks, and specialist non-card form factor (NCFF) handling devices.

Figure 1:
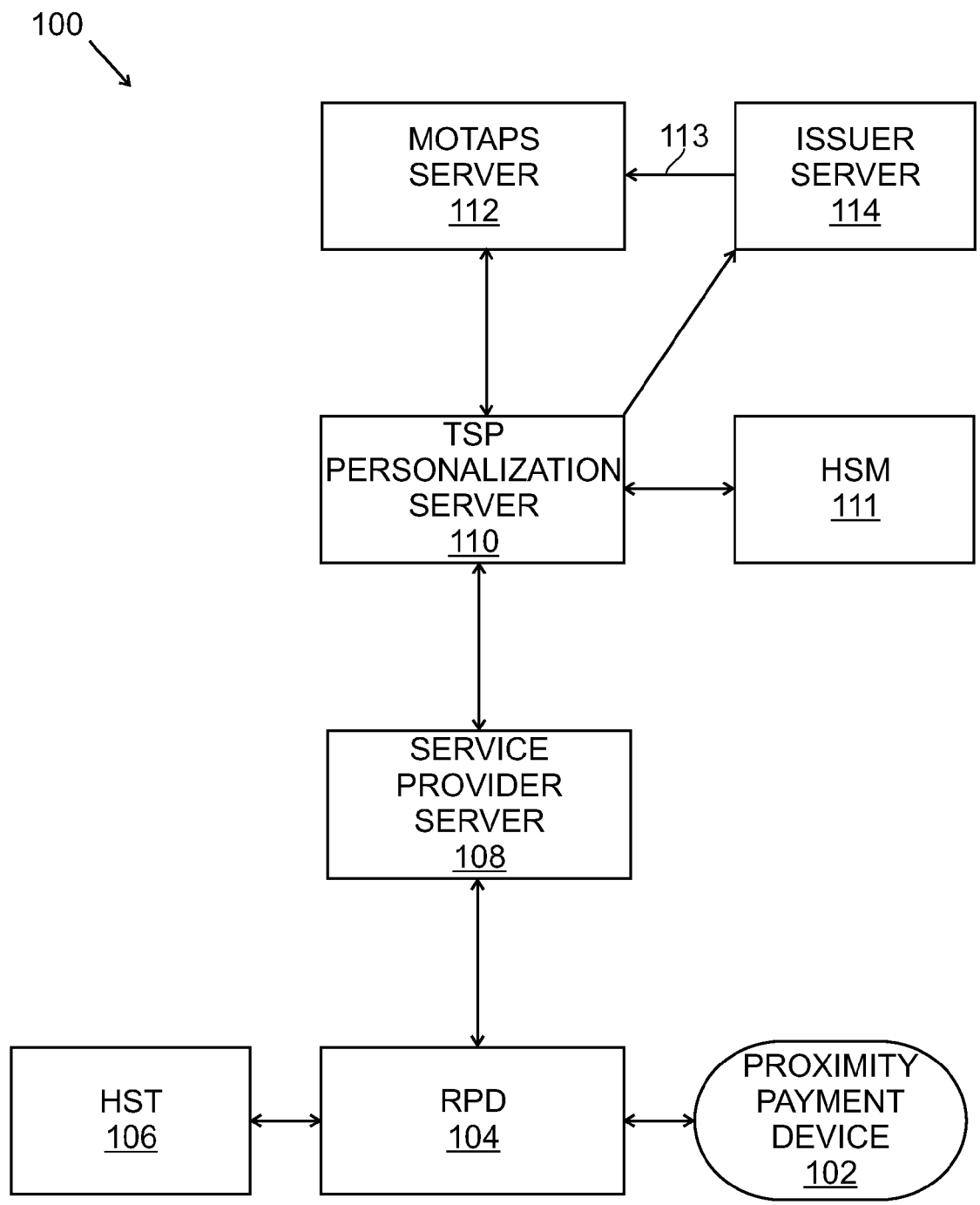
FIG. 1 is a schematic block diagram of a system that allows for remote personalization of payment devices according to an embodiment of the invention.

FIG. 1 is a schematic block diagram of an embodiment of a system 100 which allows for the remote personalization and immediate issuance of, for example, a proximity payment device 102. (It should be understood that the system 100 can also be capable of remote personalization of other types of payment devices, such as cards having contact payment devices.) A consumer (not shown) may purchase, for example, a proximity payment device 102 that is a card containing a proximity chip (not shown). The card containing the proximity chip may have a form factor similar to that of a credit card, debit card or other type of payment card, or may have different dimensions. Such a card can be purchased, for example, from a kiosk located in a stadium or from a clerk at a counter of a specialty store. But before the consumer can utilize the card to make a purchase, the card must be personalized. Thus, a Remote Personalization Device (RPD) 104 is provided that is in communication with a Hardware Security Token (HST) 106 and with a Service Provider Server computer 108. The Service Provider Server computer 108 is also configured for communicating with a Trusted Service Provider (TSP) Server computer 110 which is connected to a Hardware Security Module (HSM) 111. The TSP Server computer 110 is operable to communicate with a Mobil Over-The-Air Provisioning Service (MOTAPS) Server computer 112 and with an Issuer Server computer 114. The Issuer server computer 114 may be associated with a financial institution that issued a payment card account to the consumer, and the Issuer server computer 114 may also be configured for communication with the MOTAPS Server 112 (which communications link 113 may be specified by the MOTAPS specification to ensure secure communication).

MOTAPS was developed by MasterCard International Incorporated to provide specialist personalization services to the mobile telephone sector, and has been adapted for use in the system 100 as explained herein to provide the same personalization services to other devices, such as Non-Card Form Factor (NCFF) proximity payment devices. In particular, MOTAPS provides data preparation functionality for PayPass™ MChip and PayPass™ magnetic-stripe profile devices (and may provide such services for any compliant payment device), and is incorporated within a system supporting the indirect method of personalization using a two key zones process. Having two key zones enables the data preparation process to be independent of the IC card type. In some embodiments, the output of the MOTAPS server 112 is transmitted to the TSP Personalization server 110 using XML across a secure SSL session. Within this XML, sensitive data such as keys are encrypted with a MOTAPS transport key and stored by the TSP Personalization Server 110 within the HSM 111.

Since MOTAPS was originally designed to support mobile phone personalization, some data elements in the script are "mobile-centric". Thus, to remain compatible, existing data elements must be used, but the data values they contain may be substituted for other devices. For example, with regard to a mobile telephone MOTAPS system, the RPD 104 is a substitute for a mobile telephone, the HST identifier is substituted for a cell phone model-ID, a customer identifier (TSP or service operator) is substituted for a network operator code, and a proximity device reference number and/or serial number is substituted for the mobile telephone number. Accordingly, an HST identifier customer ID and a proximity device reference number are used in the communications with the MOTAPS server computer 112 to enable the RPD 104 to perform personalization of, for example, a NCFF proximity device.

In some embodiments, the interface or link 113 between the MOTAPS Server 112 and the Issuer Server 114 (or program manager in the case of a prepaid account) is proprietary and therefore is developed on a case by case basis for each Issuer/program manager that the service provider selects to work with. But in other embodiments a proprietary interface is not required, and in such a case the TSP Personalization Server 110 can communicate directly with the MOTAPS server 112 using a standardized interface, regardless of which issuer/program manager is providing the financial payment card accounts. In such cases, a business agreement between the MOTAPS and the issuer defines the conditions that must be satisfied to issue a card, and if these conditions are met then the MOTAPS issues the card using a pre-defined range of account numbers. Thus, the TSP Personalization Server 110 has a standard interface to the MOTAPS and it does not need to communicate directly with the Issuer Server 114.

As shown in FIG. 1, the TSP Personalization Server computer 110 is connected to the Hardware Security Module (HSM) 111, which provides functionality to generate chip session keys, to perform an external authenticate function, and to construct secure application protocol data unit (APDU) data. Commercially available HSM devices are available that are capable of providing such functionality, for example, the Thales HSM 9000™ (which, when loaded with an EMV Chip Card Personalization API can provide such functionality). It should be noted, however, that a wide range of HSM's are available that could support such functionality. For example, HSM's implemented as PC cards could be used in some embodiments instead of those designed to be mounted on a rack and connected to a network interface.

In some embodiments, for security purposes the TSP Personalization Server computer 110 is connected to the HSM 111 via a dedicated Local Area Network (LAN) (not shown) that is not shared with any other system. The TSP Personalization Server computer 110 may also be configured for communication with an Issuer Server computer 114, which link may be specified by the Issuer or by a Program Manager.

In some embodiments, the TSP Personalization Server computer 110 is operated by or on behalf of a bank or other financial institution that issued a payment card account to the consumer. Alternatively, the TSP Personalization server 110 may be operated by a service provider to which a number of different financial institutions may subcontract proximity payment device personalization services. For example, the service provider may be a payment card association, such as MasterCard International Incorporated, which may operate the TSP Personalization computer 110 on behalf of one or more banking institutions.

In addition, in some embodiments, one or more TSP Personalization servers are located within a secure hosting facility to restrict physical access to the equipment. Further security measures may also be used, such as fitting all servers with physical locks (having unique keys) to prevent access to any drives or the opening of a servers case, using tamper evident stickers applied to all doors and removable case panels, disabling all un-used ports and configuring operational ports such that "boot" devices cannot be connected thereto. Moreover, a dedicated lockable rack and remote management system could be used so that the hosting center staff need not be given physical access to the servers. Since all of the personalization software on the TSP Personalization servers is considered security relevant, a dedicated server can be used to limit the scope of any security reviews undertaken on the code. Further security measures can be taken such as hosting all RPD functionality that is not directly related to provision of the personalization service on a separate server, utilizing antivirus software and Intruder Detection Systems (IDS) on all servers, and implementing procedures to ensure that security patches are promptly installed as directed by the supplier of any software (or operating system) used.

In some embodiments, connection of an RPD directly to the TSP Personalization server computer is not permitted. Thus, all communications from an RPD is initially processed by a Service Provider server computer 108, and if identified as being valid, those messages are then forwarded via an independent internal network connection to the TSP Personalization server 110. In addition, management or console connections to network devices may be implemented on an independent network.

Referring again to FIG. 1, the RPD 104 is, in some embodiments, considered to be an untrusted device because it may be located in an unsecure environment. For example, the RPD may be a kiosk located in a shopping mall lobby that is unattended, meaning that there are no personnel there to oversee operation. In such a case, the RPD 104 cannot be used to store cryptographic keys that are required to authenticate with the TSP personalization server computer 110 during a personalization session wherein a consumer wishes to obtain a proximity payment device from the kiosk. Thus, a hardware security token (HST) 106 is utilized to store such cryptographic personalization session keys, and in some embodiments supports an X509 certificate application which is used to set up a Secure Socket Layer (SSL) session (version 3). In an implementation, the SSL session undertakes bilateral authentication with the server (both parties are authenticated) and may use hashing and encryption algorithms (for example, SHA-1 hash functions and two key 3DES or AES encryption) according to best practices. Once personalization session keys have been established, the keys are held in volatile memory so that if the RPD 104 (for example, a kiosk) is shut down or looses power, the personalization session is terminated. In some embodiments, the TSP personalisation server 110 determines the duration of the personalization session.

In some embodiments the RPDs 104 may also be considered to be "remote merchants" because they can be utilized to provide general top-up functionality (for any pre-paid proximity payment device). However, in some implementations a TSP Personalization Server 110 may be connected directly to the Issuer (program manager) server 114 and undertake top-up functions, for example, for proximity payment cards that the Issuer has issued. In some implementations, this may represent a more cost effective solution for issued cards than using the top-up networks.

As mentioned above, in some embodiments, it is required that the RPD 104 be connected to a Service Provider server computer 108 for initial processing, and not be connected directly to the TSP personalization server computer 110. In particular, all initial communications from an RPD is to be processed by the Service Provider server 108 to first identify itself as a valid RPD, and then to send messages via an independent internal network connection to the TSP personalization server computer 110. In some implementations, management or console connections to network devices are also provided on an independent network.

The system 100 thus provides for personalizing the proximity payment card 102 remotely from the host system which generates the personalisation data. Although only one RPD 104 is shown, it is contemplated that any particular service provider will offer personalisation services at multiple locations, and that the personalization services will be integrated with a range of existing services. For example, Service Provider A may utilize a plurality of kiosks in multiple locations (malls, airport lounges, college campuses, and the like) in addition to NCFF specialist devices that are contained within certain retail stores. Consequently, in order to provide a range of services to the consumer, the introduction of personalisation services by use of an RPD 104 does not impose any additional security requirements on an existing system. Moreover, the RPD 104 may provide additional and/or traditional services such as mobile phone top-up, information services (such as looking up the location of a particular store in the mall), advertising, coupons issuance, coupon redemptions, and the like.

In some embodiments, an instant issuance system for providing remote personalization of a proximity payment device such as the system 100 of FIG. 1 may be certified compliant with PCI DSS. PCI DSS pertains to a set of comprehensive requirements for enhancing payment account data security, and represents a multifaceted security standard that includes requirements for security management, policies, procedures, network architecture, software design and other critical protective measures. Such a comprehensive standard helps organizations proactively protect customer account data. The core of the PCI DSS is a group of principles and accompanying requirements around which the specific elements of the DSS are organized, including building and maintaining a secure network (for example, by the use of firewalls and strong passwords), protecting cardholder data (by protecting stored data and encrypting transmission of cardholder data and sensitive information across public networks), maintaining a Vulnerability Management Program (i.e., using and regularly updating anti-virus software, and developing and maintaining secure systems and applications), implementing strong access control measures (such as restricting access to data by business need-to-know, assigning a unique ID to each person with computer access, and restricting physical access to cardholder data), regularly monitoring and testing networks (by tracking and monitoring all access to network resources and cardholder data, and by regularly testing security systems and processes), and by maintaining an Information Security Policy.

Figure 2:
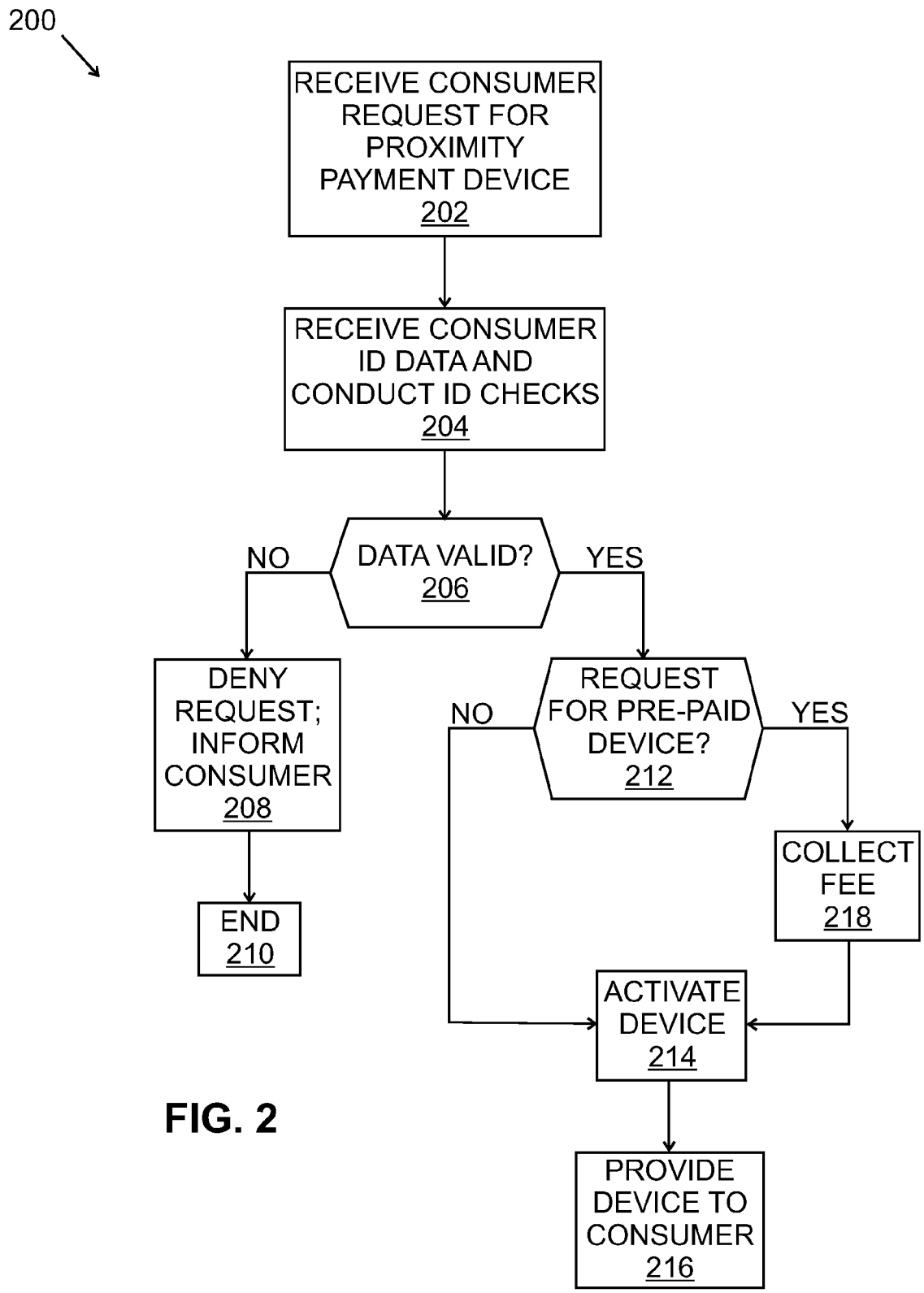
FIG. 2 is a flowchart that illustrates a process for issuing, accepting payment, and enabling a proximity payment device according to an embodiment of the invention.

FIG. 2 illustrates a process 200 for issuing, accepting payment, and enabling a proximity payment device. It should be understood that a similar process may be implemented for issuing, accepting payment and enabling a payment device that does not include a proximity payment IC, for example, a payment card having a contact chip interface. In addition, it should be understood that specific rules and regulations governing how a request for a payment device can be initiated, and determining when a payment device can be issued must be defined and implemented by a particular service provider. For example, specific consumer information may be required depending on the type of product being purchased and/or on the country of issuance. For example, no consumer information would be required if a gift card was being purchased from an RPD by a consumer, but if the consumer is purchasing a travel money card (an "FX card") at an airport then he or she may be required to scan his or her passport during the transaction. But in general, referring to FIG. 2, in some embodiments a consumer request is received 202 at a proximity payment device by, for example, from a consumer utilizing a touch screen to enter the request at a kiosk, or by the consumer speaking to a representative of a service provider (for example, by a representative at a supervised desk-based instant issuance system). In another example, a retail clerk in a specialty store may be authorized to offer and to issue a proximity payment device to consumers in accordance with an automated short production run (for example, a retail store clerk may be authorized by a Specialist NCFF or limited-run personalisation bureau to offer, for example, branded proximity key fobs to consumers for product promotional business reasons).

Referring again to FIG. 2, consumer identification data is then received 204 and identification checks are run on the consumer. For example, the consumer may provide identification information by keying in identification and payment card account data at a kiosk input device (such as a keyboard) so that a background check can be performed regarding his or her identity and/or account status. Data that may be provided may include, for example, consumer identifying data (e.g., his/her name and address), a payment card account number, security information (e.g., a PIN and/or a card security code printed on the back of his/her payment card) and/or other information that is needed by the issuer (or by another party on behalf of the issuer) in order to process a request for personalization services. If the information provided by the consumer is determined 206 to be invalid, then the request for a proximity payment device is denied 208 and the consumer is informed of the decision (for example, by a message displayed on a display screen of a kiosk, or by a message transmitted to a specialist device (such as a store laptop computer) and orally communicated to the consumer by a retail clerk). The process then ends 210.

But if the consumer identification and payment card information is validated in step 206, then it is determined 212 if the request is for a prepaid proximity payment device. If the request is not for a prepaid device, then the proximity payment device is activated 214 (meaning that personalization of the device is conducted and then finalized), and the device is provided 216 to the consumer (for example, handed to the consumer by a store clerk, or released from an interior location of a kiosk into a delivery bin accessible to the consumer).

Referring again to FIG. 2, if in step 212 it is determined that a pre-paid proximity payment device has been requested, then before such a card is issued payment is collected 218 from the consumer. The payment may be, for example, in the form of a bank card payment, or a cash transaction. The payment method, the amount charged and the rules that are applied for such a payment are outside the scope of the present disclosure as such rules and charges must be defined and implemented by the service provider. After the pre-paid proximity payment device has been requested and paid for, it is then personalized and enabled or activated 214 and then provided 216 to the consumer.

In some embodiments, the proximity payment device is personalized and activated or enabled by undergoing a personalization process conducted by the system 100 of FIG. 1. In an implementation, the process involves reading the primary account number (PAN) from the cardholders own MasterCard™ payment card (or another brand payment card), and then contacting the issuer of that device to confirm permission to create a companion device on the same account. In one example, the cardholder's own device is a magnetic stripe card, and the device produced is a contact, contactless, or dual interface chip card. Thus, for example, the consumer or cardholder obtains a key fob proximity payment device that is linked to his or her payment card account. In some embodiments, the process requires the cardholder to provide additional security and/or verification information such that the Issuer can be satisfied that the cardholder is the legitimate holder of the payment device (for example, the magnetic stripe card) for which the companion payment device (the key fob proximity payment device) is being issued. Such a service could be performed at a souvenir shop, or a watch shop or apparel shop, for example, where the consumer selects a Non-card form factor device that he or she desires to link to the account of his or her normal payment card. In another implementation, the consumer's original or regular magnetic stripe card may be retained and destroyed by the RPD, for example, in exchange for issuing an EMV chip card payment device. In such an embodiment, the RPD may include components to transport the consumer's regular card to, for example, a bin located within the RPD housing for later destruction by authorized personnel, or the RPD may include a shredder device for destroying consumer cards. Receiving an EMV chip card payment device may be desirable, for example, for a United States citizen who is about to travel internationally to a country that generally accepts EMV chip cards for purchase transactions but does not accept magnetic stripe cards for such transactions. In some embodiments the EMV chip card issued to the consumer is independent of or in addition to the consumer's original or magnetic stripe card, and thus the consumer keeps both his or her original magnetic stripe card and the EMV chip card.

In some implementations, the term "card stock" includes traditional bank payment cards, PayPass™ enabled event tickets, PayPass™ enabled stickers (with or without ferrite backing), and other PayPass™ enabled Non-Card Form Factor (NCFF) devices. The value of card stock from a security perspective depends on its physical functionality and personalization state. Card stock may have more value to an attacker or vandal if it has a magnetic stripe, a hologram and other payment card security features because such card stock could be used in non-chip enabled markets. Chip cards that have been fully personalised may also be passed off as a legitimate payment cards in some offline environments. However, chip-only un-personalised and pre-personalised card stock cannot be used directly in any environments, and therefore has far less value (unless an attacker has a method to personalize such cards). Three types of card stock are contemplated for use with the described system: Un-personalized card stock; pre-personalized card stock; and personalized card stock.

In some embodiments, un-personalized card stock is protected by a diversified transport key created by the chip supplier. Thus, a key exchange with the chip supplier and the trusted service manager (TSP) personalization server 110 (see FIG. 1) is required so that the hardware security module (HSM) 112 has the necessary master key to undertake pre-personalization. Although such card stock is not cryptographically linked to a particular payment product or card issuer, the card artwork on one or both sides of the card may be linked to a particular payment card product. In addition, the commands required to move the card to a pre-personalized state may be proprietary and will vary depending on the card manufacturer. Thus, the system 100 is required to recognize that this type of card stock is being utilized so that it can send the correct commands.

Pre-personalized card stock may be protected by a diversified personalization key ($KD_{perso}$) created by the Issuer financial institution. Thus, in some embodiments a key exchange with the Issuer server 114 and the TSP personalization server 110 will be required so that the HSM 112 has the necessary Master Personalization key (KMC) to undertake personalisation. Pre-personalized card stock is linked to an issuer, and may also be linked to a particular type and/or brand of payment product. Such card stock does not have a PAN or expiry date, and in some implementations the commands required to move a card to the personalized state are standard and are based on the common personalization specification. In some embodiments, the personalization service will not need the exact details of the card stock since all stock will behave in the same way.

Personalized card stock includes a PAN and expiration date and all other data elements required for it to function when presented to a payment terminal, so it does not need to be personalized by a system such as the system 100 shown in FIG. 1. In general, an enablement message must be sent to the program manager and/or the card Issuer before value can be loaded onto the card and/or before the card used for online payment transactions.

Procedures for storing, distributing and disposing of card stock need to be defined and followed. In particular, it is important that missing stock can be quickly identified, such that steps can be taken to ensure it cannot be used. The Trusted Service Provider (owner of the TSP Personalization Server computer) may not be directly involved in the procurement, storage, or loading of an RPD with card stock. In some embodiments all card stock carries a unique reference number which is printed on one face of the card. NCFF proximity payment stock devices may also include a visible unique reference number. This unique reference number can also be included in a database, in some implementations, maintained by the TSP personalization server computer, and can be transmitted to the MOTAPS server when a request for personalization data is made.

In addition, in some implementations card stock is packaged in known volumes that may depend on form factor (for example, 500 plastic cards or 1800 paper cards) and each pack and/or roll has a unique identifier. In some embodiments, at least one check digit is included to ensure so that, when identifiers are manually entered, typing errors can be easily and immediately identified. Such a requirement assists in controlling inventory because the generic location of all cards in known. A pack size may, however, vary by mutual agreement as commercially required. Another requirement that may be implemented is that when card stock is moved between locations, the packs and/or rolls are not split up.

In the case of faulty and/or held proximity payment cards that are removed from the RPD, an authorized person (such as a representative of the service provider) confirms that he/she has taken possession of the cards, and procedures are followed to verify that such faulty proximity payment cards are ultimately destroyed.

Figure 3:
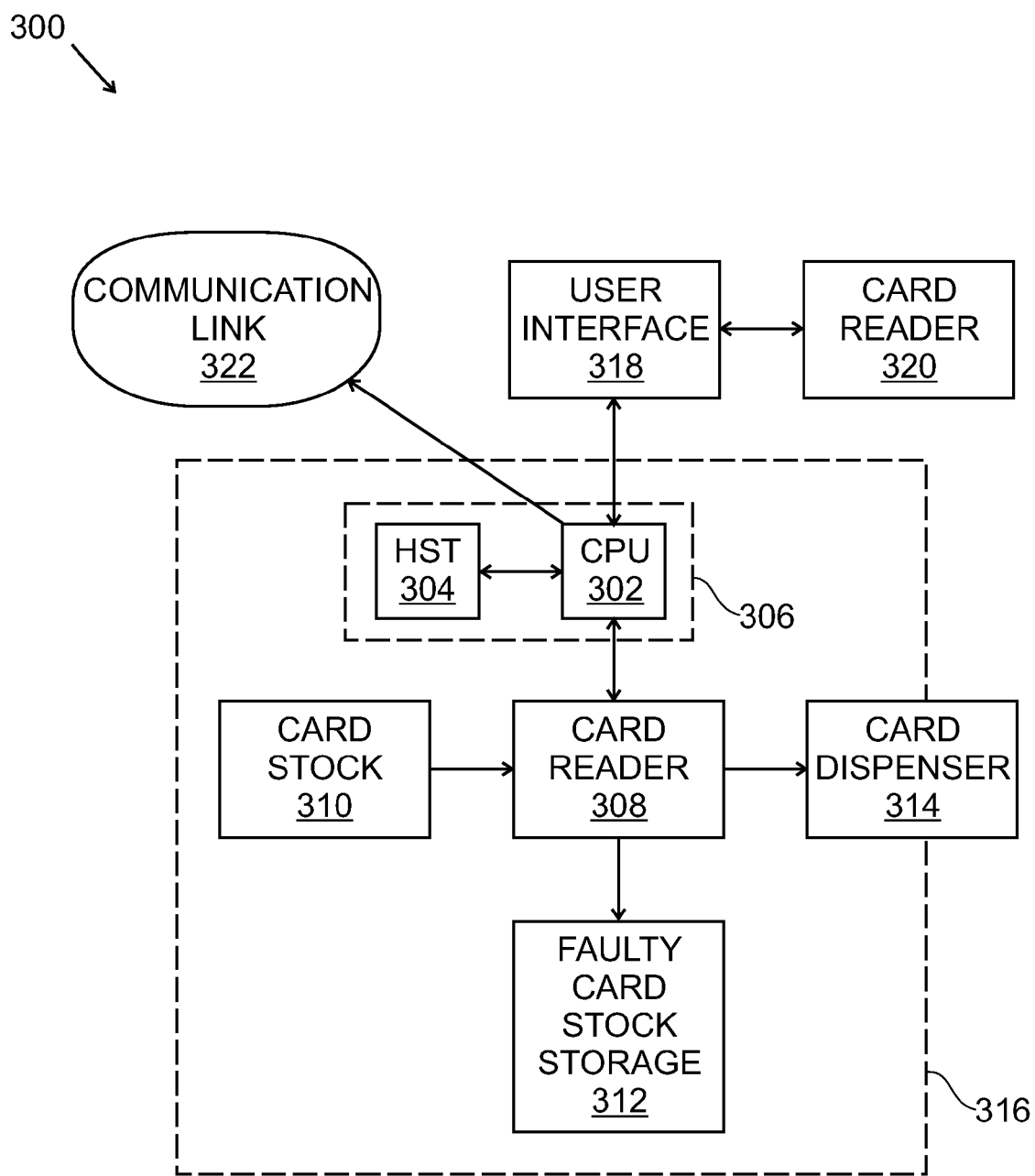
FIG. 3 illustrates an embodiment of a remote personalization device (RPD) according to an embodiment of the invention.

FIG. 3 is a block diagram illustrating an embodiment 300 of the components of a remote personalization device (RPD) 300. Three different types of RPDs are contemplated as mentioned above: a kiosk for use by the general public; a desk top unit that may be operated by a member of staff who is issuing a PayPass™ device to the general public (e.g., a ticket agent, a campus facility manager, an events coordinator, and the like); and an industrial unit intended to personalise multiple PayPass™ devices in batches.

In some embodiments, the role of an RPD 300 may be based on a method defined in an EMV Card Personalisation Specification (EMV Card Personalization Specification published by EMV Company), so that the data preparation system (MOTAPS) need not have knowledge of the ICC data used to establish a secure channel for a particular target proximity device and/or application. The proximity device personalization method assumes two security zones, one between the MOTAPS and the TSP server, and a second zone between the TSP server and the ICC (Card to be personalised in a Kiosk). In some implementations, the RPD receives Data Group Identifier (DGI) data and Personalisation Device Instructions (PDI) from the TSP server. The TSP server establishes a secure channel to the proximity payment device (the proximity card), decrypts and/or re-encrypts the sensitive data (application keys and PIN), and creates and sends personalisation APDU commands to the card. In order to ensure secure communications, an HSM may be connected directly to the TSP Personalisation server via a dedicated connection. As mentioned above, the HSM holds all security keys which, under the command of the TSP personalisation server, are used to perform the required cryptographic operations.

Referring again to the block diagram of FIG. 3, the RPD 300 may be a kiosk that includes a central processing unit (CPU) 302 in communication with a Hardware security Token (HST) 304 that reside in a secure enclosure 306. An internal card reader 308 is in communication with the CPU 302, and is connected to a card stock storage and feed mechanism 310, a faulty card stock storage bin 312, and a card dispenser 314. The card reader 308, card stock storage and feed mechanism 310, faulty card stock storage bin 312 and card dispenser 314 together form a card stock dispenser means for either dispensing a personalized card to a consumer, or retaining a faulty card within the RPD 300. The secure enclosure 306 and the components 308, 310, 312 and 314 are all enclosed within a housing 316. It should be understood that, for ease of reference, the components 308, 310, 312 and 314 have all been labelled with the term "card", but that such components, in some embodiments, are configured so as to be capable of supplying, reading, storing and dispensing non-card form factor (NCFF) payment devices, such as key fobs, stickers, and the like.

The CPU 302 is also in communication with a user interface 318 (which may be, for example, a touchscreen, or a screen and a keyboard), which in turn is connected to a card reader 320 and is located on an outside portion of the housing 316. The card reader 320 is used, for example, to read a supervisor card to authenticate the operator before permitting access to kiosk management functions. The card reader 320 may also read a "maintenance card" that allows maintenance personnel to access interior portions of the kiosk by, for example, unlocking an electronic, physical locking mechanism (not shown) so that an access door (not shown) can be opened.

As mentioned above, the card reader 308, the card stock storage and feed mechanism 310, the faulty card stock storage bin 312, the card dispenser 314, and the secure enclosure 306 (containing the HST 304 and CPU 302), are all enclosed within a housing 316 (for example, within the walls of a kiosk) that is designed to restrict access (keep out members of the public, including consumers). The housing 316 may be a lockable protective casing that is at least "tamper evident", and the secure enclosure 306 (which houses the CPU 302 and HST 304) may also be lockable and include hardened steel walls for improved security. For example, the housing 316 may be fabricated of sheet metal or of a composite material that deforms and/or cracks if, for example, a thief uses force in an attempt to gain entry to steal card stock. In some embodiments, the level of physical security to utilize is the responsibility of the service provider.

In some embodiments, the RPD may be required to undertake additional services beyond personalization of payment devices. In such cases, the functionality of the RPD may be utilized, or it may be incorporated as a module within another device. Many of the additional tasks have minimal security requirements, so the personalization functionality does not impose additional security overhead on these other services.

In order to meet this requirement, in some implementations the RPD operates in a largely passive role during personalization, working as a slave device under the direct control of a TSP personalization server 110 (see FIG. 1). Accordingly, a communication link 322 is shown for secure communications between the CPU 302 and a Service Provider Server computer 108 (FIG. 1), which in turn is operable to communication with a TSP Personalization Server 110. In some implementations, mechanisms may be in place for the RPD (or the system containing the RPD) to authenticate itself to the Service Provider Server 108, but such a process will not be relied upon by the TSP Personalization Server 110. Instead, the RPD utilizes the HST 304 (which may be a contact smart card) to authenticate itself to the TSP Personalization server, and to encrypt all communications. Once authenticated, the HST 304 generates and passes to the CPU 302 personalization session keys to encrypt all further communications with the personalization server.

During operation, when the RPD 300 is required to issue a proximity payment card, the CPU 302 instructs the card storage and feed mechanism 310 to obtain and move the "next card" from storage into the internal card reader 308. The CPU 302 receives data from the card reader 308 enabling it to identify the card type (Magnetic stripe profile, M/Chip or not pre-personalized), and to read the unique serial number of that card. The CPU 302 then transmits this information via the communication link 322 to the service provider server 108. If the request is identified as being valid, it will then be passed to the TSP Personalization server which will process the request further. In some embodiments, the TSP Personalization server computer runs additional validation checks and if all is in order, then controls the RPD to undertake any personalization process that is required (which depends on the type of proximity payment card to personalize).

It should be understood that, in some embodiments the communications link 322 may be a mobile telephone link (for example, a GSM mobile phone link could be established). In addition to transferring card identification data and personalization data, for example, such a mobile telephone communications link 322 could be utilized to transmit alerts if any tampering occurs or is attempted with regard to the RPD.

The software implemented on the RPD to communicate with the proximity card is robust and operable to identify personalization and/or communication errors (as defined in ISO/IEC 7816 part 4, and the EMV specifications) and correctly recover as appropriate. Proximity payment cards that have failed personalization must be stored for secure disposal, and are never dispensed to a cardholder. Thus, in some implementations, the RPD includes a faulty card stock storage bin 312 for accumulating such faulty card stock. In some implementations, the RPD maintains detailed logs (not containing sensitive data) that are frequently transferred to the personalization server. Once it is acknowledged that the personalization server received a log entry, it is erased from the RPD's memory.

In some embodiments, all staff and engineers involved in the provision of the personalization service undertake two-factor authentication when interacting with the RPD. In an implementation, such personnel utilize a contactless smart card (i.e., a supervisor card) that is presented to a contactless reader 320 accessible as part of the RPD's user interface. The RPD prompts the user for their 'password' which is entered via a user interface 318 (i.e., a keyboard, keypad, or a touch screen display). Once the supervisor card is authenticated with the personalization server, the RPD enters a service mode with functions available according administrator rights dictated by the personalization server. Examples of administrator rights/functions include, but are not limited to: add card stock (enter pack/roll number); remove stock from the RPD (final/temporary removal, which functionality may be used at the end of an event, or when the RPD (e.g. kiosk) is moved between locations); replace stock in the RPD (where stock has been removed from a RPD on a temporary basis, for example between events, the original stock removed can be reloaded); remove faulty and/or 'held' cards from the waste card stock storage bin (although the system is aware of the quantity of cards in the waste bin, personnel taking the cards will be asked to confirm the quantity for audit purposes); issue a test card (test personalization data used); and enable and/or suspend personalization functionality (this may be local functionality, even though reported to and enforced by the personalization server, to disable personalization functionality when no longer required on a temporary basis. For example, this service mode may be used between events, over night at a specialist bureau, or when an RPD is being transported from one location to another).

In some embodiments, diagnostic and test functions are provided to allow for any issues that may arise during the working life of an RPD so that any such issues can be identified and resolved. For example, if the kiosk outer housing 316 of the RPD 300 is opened, or any event occurs that may compromise the RPD's security, an alert is transmitted by the CPU 302 to the TSP Personalization server (via the Service Provider server) which causes the TSP Personalization server to erase its current SSL session keys. The RPD 300 therefore cannot operate again until it has re-authenticated with the TSP Personalization server.

Figure 4:
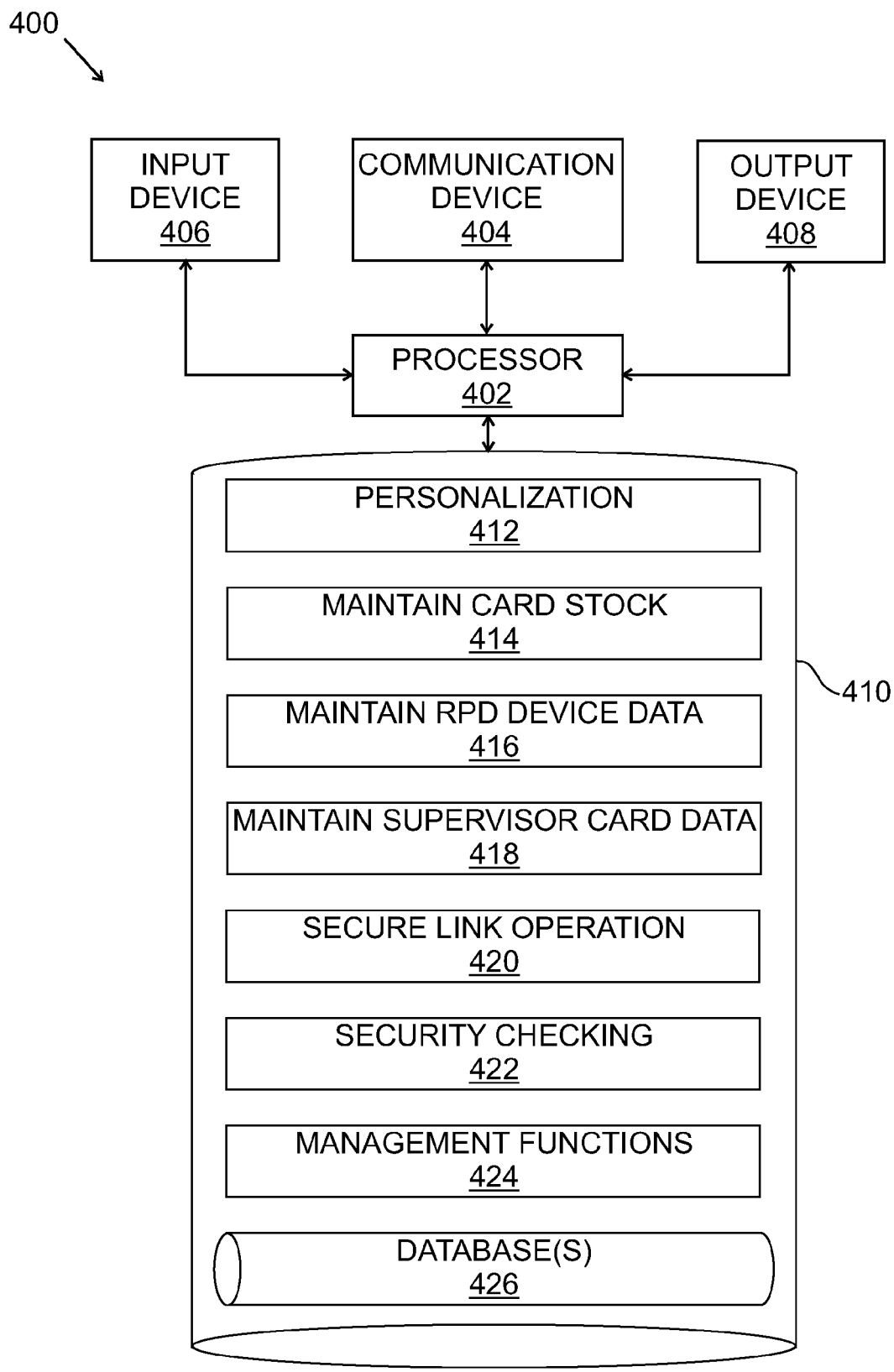
FIG. 4 is a block diagram of an embodiment of a Trusted Service Provider (TSP) Personalization Server computer in accordance with an embodiment of the invention.

FIG. 4 is a block diagram of an embodiment of a Trusted Service Provider (TSP) Personalization Server computer 400. The TSP Personalization Server computer may be conventional in its hardware aspects but may be controlled by software to cause it to operate in accordance with aspects of the methods presented herein. In particular, the TSP Personalization Server computer 400 may include a computer processor 402 operatively coupled to a communication device 404, an input device 406, an output device 408, and a storage device 410.

The computer processor 402 may constitute one or more conventional processors. Processor 402 operates to execute processor-executable steps, contained in program instructions described herein, so as to control the TSP Personalization Server computer 400 to provide desired functionality.

Communication device 404 may be used to facilitate communication with, for example, other devices (such as third party application server computers and/or the Service Provider Server computer 108 shown in FIG. 1). Communication device 404 may, for example, have capabilities for engaging in data communication over proprietary networks and/or over conventional computer-to-computer data networks. Such data communication may be in digital form and/or in analog form.

Input device 406 may comprise one or more of any type of peripheral device typically used to input data into a computer. For example, the input device 406 may include a keyboard and a mouse and/or a touchpad. Output device 408 may comprise, for example, a display and/or a printer.

Storage device 410 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as "flash" memory devices. Any one or more of the listed storage devices may be referred to as a "memory", "storage", "storage medium" or "computer readable medium".

Storage device 410 stores one or more programs for controlling processor 402. The programs comprise program instructions that contain processor-executable process steps for the TSP Personalization Server computer 400, including, in some cases, process steps that constitute processes provided in accordance with principles of the processes presented herein.

The programs may include an application 412 that manages a process by which the TSP Personalization Server computer uses an indirect method of card personalization and/or Non-Card Form Factor (NCFF) personalization. For example, the process may include converting data received from the MOTAPS server into Application Protocol Data Units (APDU's) for the actual card being personalized. In addition, a card stock (or payment device) maintenance application 414, a RPD device data (hardware security tokens) maintenance application 416, and a supervisor cards and access rights maintenance application 418 may be included. These applications may cause the processor 402 to maintain one or more databases containing, for example, card stock an/or payment device data, RPD identification data, HST data, and/or supervisor card data.

The storage device 410 may also store applications 420 to 426 for controlling the TSP personalization Server computer 400. In particular, a secure link operation application 420 provides for operating a secure, authenticated link between the TSP Personalization computer and any RPD containing a valid hardware security token for the purpose of personalizing a card or device. A security check application 422 may implement security checks whenever a personalization request is received to confirm that a valid RPD is making the request for a card it is known to contain, and a management functions application 424 provides management functions and maintains detailed logs of all events that occur to enable security audits to be undertaken. Yet another application, which may be referred to as a management functions application 426 operates to respond to MOTAPS with appropriate messages throughout the process.

In some embodiments, the TSP personalization server computer may be operable to pre-request personalization data from MOTAPS. For example, the TSP personalization server may be operable to recognize that a card having serial number "1234" has been issued and that cards having serial numbers "1235", "1236", "1237" and so forth are next in the card stock for that RPD (which may be, for example, a kiosk in a high-traffic shopping mall) such that the TSP personalization server can pre-request the "perso" data. The pre-requested data can then be utilized quickly as consumers purchase cards from the RPD. Such operation would be advantageous in cases where an RPD is located in a busy issuance location, and furthermore would make the TSP personalization server more resilient to temporary glitches in the MOTAPS communication link. Moreover, throughput of cards in busy times can be improved to increase customer satisfaction. In some embodiments, such pre-requested personalization data may have a limited usage time limit so that if the pre-requested personalization data is not utilized, for example, within one hour from the time it was requested, then that personalization data is discarded. In such implementations, the next time the RPD is used then the TSP personalization server requests fresh personalization data.

Reference numeral 428 in FIG. 4 identifies one or more databases that are maintained by the TSP Personalization Server computer 400 on the storage device 410. Among these databases may be, for example, security logs, card stock database, an RPD database, a Supervisor card database, an issuer database, and a transaction database.

For example, the storage device 410 may contain a database of all "card stock" known to the system, including card stock in storage or transit, loaded into RPD's, issued and/or faulty. (The term "card stock" means all payment devices that may be issued to a consumer, including payment cards containing proximity circuitry, NCFF devices, such as key fobs, stickers, and the like capable of being utilized as a payment device, and cards having magnetic stripes.) The card stock database includes, and the TSP Personalization data server computer 400 maintains the serial number and/or unique identification number of every payment device, which may for example be a reference number printed on the face or visible portion of the payment device (which, in some embodiments, may be calculated from the serial number of such payment device), the batch (pack/roll number) of the payment device, and the payment device type (i.e., the chip/PayPass™ application that is loaded on that payment device including version numbers).

In some embodiments, a profile will be present on the TSP Personalization Server computer for each payment device type to inform the system how to process that product. The profile may contain an indication of the current personalization state, which is whether the payment device is un-personalized, pre-personalized, personalized, or personalized and enabled on the issuers system. The profile may also contain the current issuance state of the payment device, such as whether the payment device is in storage (not confirmed delivered from a payment device vendor, in the case where a data file from the vendor has been loaded into the system, but it has not been confirmed that the payment devices have been received by the end customer), or the payment device is in storage (confirmed delivered from payment device vendor), or that the payment device has been loaded and/or associated with an RPD (e.g., the payment device is actually loaded within a kiosk), or the payment device has been temporality removed from an RPD (e.g., the payment device is being held in temporary storage, and is not within kiosk), or the payment device has been issued, is faulty, was destroyed, and/or was lost or stolen. The card stock database may further include data indicating the date on which the issuance state last changed, and/or the current owner of the card stock. It should be noted that, in some embodiments, the current owner of the card stock (not the TSP Personalization Server computer) is responsible for tracking the physical location of the card stock, as the main function of the TSP Personalization computer is to provide the necessary data to an RPD to personalize a valid payment device.

The storage device 410 may also include a Remote Personalization Device (RPD) database of all RPD's (including all hardware security tokens (HSTs)) so that the TSP Personalization Server Computer can validate any request from an RPD to authenticate to the server, and undertake personalization functionality. In some embodiments, the RPD database includes the serial number and/or unique identity of the HST, the keyset used by the HST (the keys themselves are stored in the HSM), data identifying the current owner (the responsible party) of each RPD, the current status of an RPD, data concerning lost and/or stolen RPDs, data indicating that an RPD is disabled for personalization purposes, data indicating that an RPD is temporarily disabled for personalization purposes (for example, data indicating that a local request from kiosk was made to disable the personalization functionality), and data indicating that an RPD is enabled for personalization. In the case of a lost or stolen RPD, a request for personalization from such an RPD will be flagged immediately as a management alert by the TSP Personalization Server computer (which will not respond to that request) and a message will be transmitted so that appropriate action can be taken (for example, notifying the police and/or other authorities). In some embodiments, however, it is the responsibility of the current owner of an RPD to track the physical location of the RPD as the TSP Personalization Server computer only needs to know that the RPD is valid to personalize a card when a personalization request is received from that particular RPD.

In some implementations, the storage device 410 may also include a database of supervisor cards, which can be used by the TSP Personalization Server to validate any management request to the server, and to track who has made that request. In some implementations, the database includes serial numbers and/or unique identity data relating to supervisor cards, keyset data that may be used by the supervisor cards (for example, keys that are also held in the HSM), and supervisor card current owner data. In addition, the database may include supervisor card current status data such as data concerning supervisor cards that have been lost or stolen (so that the TSP Personalization Server computer will recognize and flag the occurrence as a management alert and not respond), and/or data showing that a particular supervisor card is disabled, or enabled. The supervisor card database may also include data concerning the security level provided to the holder of the supervisor card. For example, supervisor card holders may have the ability to load card stock into an RPD, to remove and/or replace card stock from the RPD, to remove faulty card stock from the an RPD, to issue a test card, to enable and/or suspend personalization functionality at an RPD, to confirm that a payment device has been destroyed, to issue a new supervisor card, to edit the status and/or revoke a supervisor card, to reset the password and/or PIN number on a supervisor card, to issue a new hardware security token, to edit the status and/or revoke a hardware security token (RPD database), and/or to load new card stock into the card stock database, to edit and/or remove card stock in the card stock database, to access the HSM to load and/or delete keys (i.e., undertake a new key exchange), to load new and/or disable card types and/or profiles, to add and/or modify security rules undertaken by system, to enable and/or disable the system (master on/off control), and/or to access logs (which ability may be split into various sub levels). In some implementations, it is the responsibility of the organization that issued the supervisor cards to maintain accurate records of the actual members or staff holding such supervisor cards, and in such cases is not a function of the TSP Personalization server computer.

The application programs of the TSP Personalization Server 400, as described above, may be combined in some embodiments, as convenient, into one, two or more application programs. Moreover, the storage device 410 may store other programs, applications and data, including but not limited to one or more operating systems, device drivers, database management software, web hosting software, and the like.

In some embodiments, the TSP Personalization Server may be strictly controlled, so that only staff are permitted to authenticate to the server with a supervisor card of sufficient privileges before any management functions are undertaken. To further enhance security, the TSP Personalization Server may maintain two independent channels for management functionality: a kiosk interface for clients of the system and kiosks (wherein management functionality is limited to local kiosk controls); and a Management Interface which may be a private interface for a trusted service manager to control management functionality.

The TSP Personalization Server functions mentioned above may be implemented with sufficient controls to ensure that accidental errors cannot normally occur (for example, most functions will not allow direct editing of data held on the server). The TSP Personalization Server may also maintain detailed time stamped logs to allow auditing of the server operation to be undertaken. These logs shall be strictly write-only so that it is not possible to edit or delete entries. Such logs may take the form of: a Management Log containing details of all management requests received by the server, including identity of supervisor card used; a Security Log containing the details concerning all failed authentications that have occurred; an Alerts Log containing details of all management alerts issued by the server; and a Personalization Log. Further logs may also be maintained as required providing they do not impact PCI DSS compliance requirements (which requirements comprise a set of comprehensive rules for enhancing payment account data security).

As part of MOTAPS, the TSP Personalization Server must provide a number of notification messages to MOTAPS during each personalization process. Since MOTAPS was originally developed for personalizing mobile phones, some of the notifications from the TSP Personalization Server are "mobile-centric", but all must be transmitted by the TSP Personalization Server. Examples of such notifications include MOTAPS "Dummy" Notifications sent by the TSP Personalization Server when APDU data is sent to the RPD, when data is downloaded to the RPD, when the data download to the RPD ends, and when a verification code is received by the TSP Server from the RPD. The MOTAPS is also notified of the start of a personalization data download, and of the successful end of the personalization download or of the failure of the personalization download.

Figure 5A:
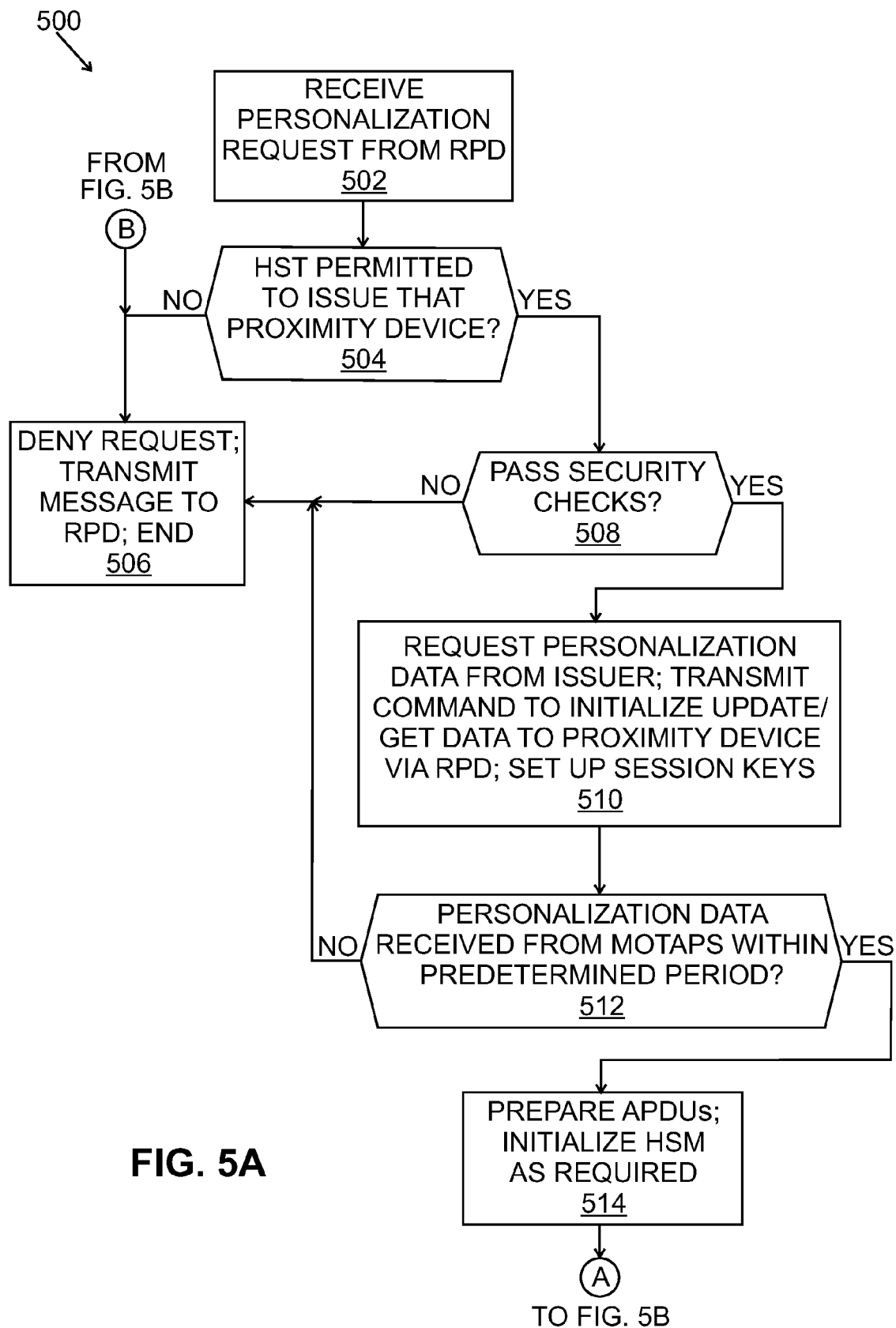
FIGS. 5A and 5B together form a flow chart illustrating an embodiment of a TSP Personalization Server computer process for remote personalization in accordance with an embodiment of the invention.
Figure 5B:
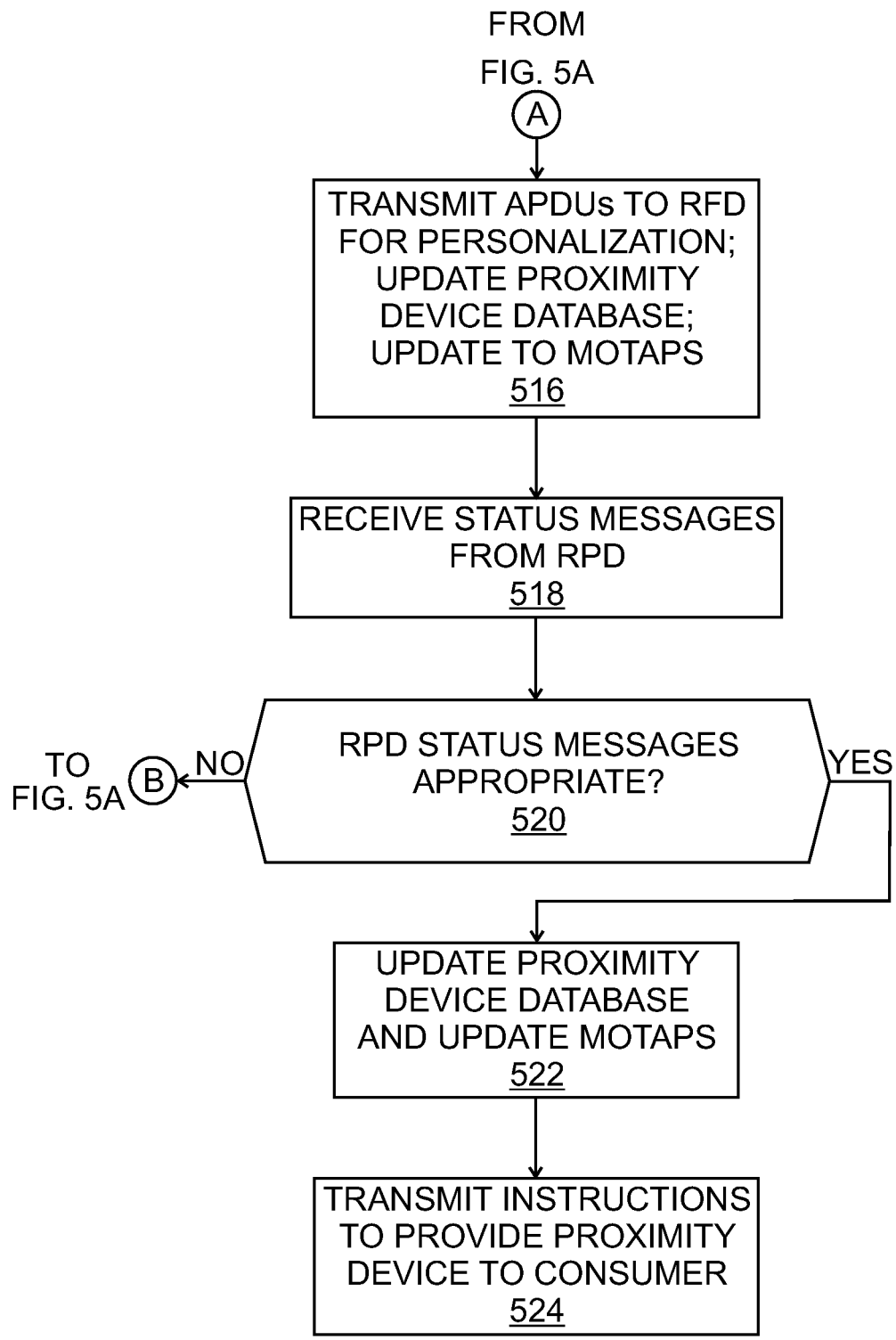

FIGS. 5A and 5B together form a flow chart illustrating an embodiment of a TSP Personalization Server process 500 in accordance with the remote personalization of a proximity payment device. The process 500 begins when the personalization server receives 502 a personalization request from an RPD concerning a proximity payment device purchased by a consumer, which request includes, for example, PRD device data, proximity device data, consumer identity data, and/or payment card account data, as mentioned above. The TSP Personalization Server then determines 504 whether or not the Hardware Security Token (HST) associated with that RPD is permitted to issue the proximity device being requested. If it is determined that the HST is not permitted to issue the proximity payment device, then the request is denied 506 and a message is transmitted to the RPD for relaying to the consumer regarding the denial and the process ends. If the HST is permitted to issue the proximity payment device, then the TSP personalization server performs security checks 508. If the security checks fail, then the request is denied 506 and a message is transmitted to the RPD for relaying to the consumer regarding the denial and the process ends.

If in step 508 the security checks are passed, then the TSP personalization server requests 510 personalization data from the Issuer financial institution server (or the program manager/processor in the case of a prepaid account), transmits a command to initialize/get data to the proximity device via the RPD, and sets up session keys (wherein it should be understood that some or all of these actions may take place in parallel). Next, the TSP Personalization Server determines 512 if personalization data has been received from MOTAPS Server within a predetermined period of time. If not, then the request is denied 506 and a message is transmitted to the RPD for relaying to the consumer regarding the denial and the process ends. If the personalization data was received from the MOTAPS Server within the predetermined time period, then the TSP Personalization Server prepares 514 APDU's and initializes the Hardware Service Module (HSM) as required for cryptographic operation.

Referring again to FIG. 5A, the TSP Personalization Server next transmits 516 the APDU's that are needed to personalize the proximity payment device via the Service Provider Server to the RPD for personalization. Next, the TSP Personalization Server receives 518 status messages from the RPD concerning the progress of the personalization process, and whether or not the proximity payment device has been tested and/or issued to the consumer. If the TSP Personalization Server determines 520 that the RPD status messages are not appropriate, then the personalization request is denied 506 and a message is transmitted to the RPD for relaying to the consumer regarding the denial and the process ends. But if the TSP Personalization Server determines 520 that the RPD status messages are appropriate then the TSP Personalization Server updates 522 the proximity payment device database, and updates MOTAPS by transmitting proximity payment device status data to the MOTAPS Server. The TSP Personalization Server then transmits 524 instructions to the RPD via the Service Provider Server to provide the proximity payment device to the consumer. For example, if the consumer is utilizing a kiosk to purchase the proximity payment device then the instructions may cause the RPD to release the personalized proximity payment device from an interior portion of the kiosk into a delivery bin that is accessible to the consumer. It should be understood that a similar TSP Personalization Server process could be utilized for remote personalization of other types of payment devices that have a contactless interface, for example payment cards having a contact plate only.

Figure 6:
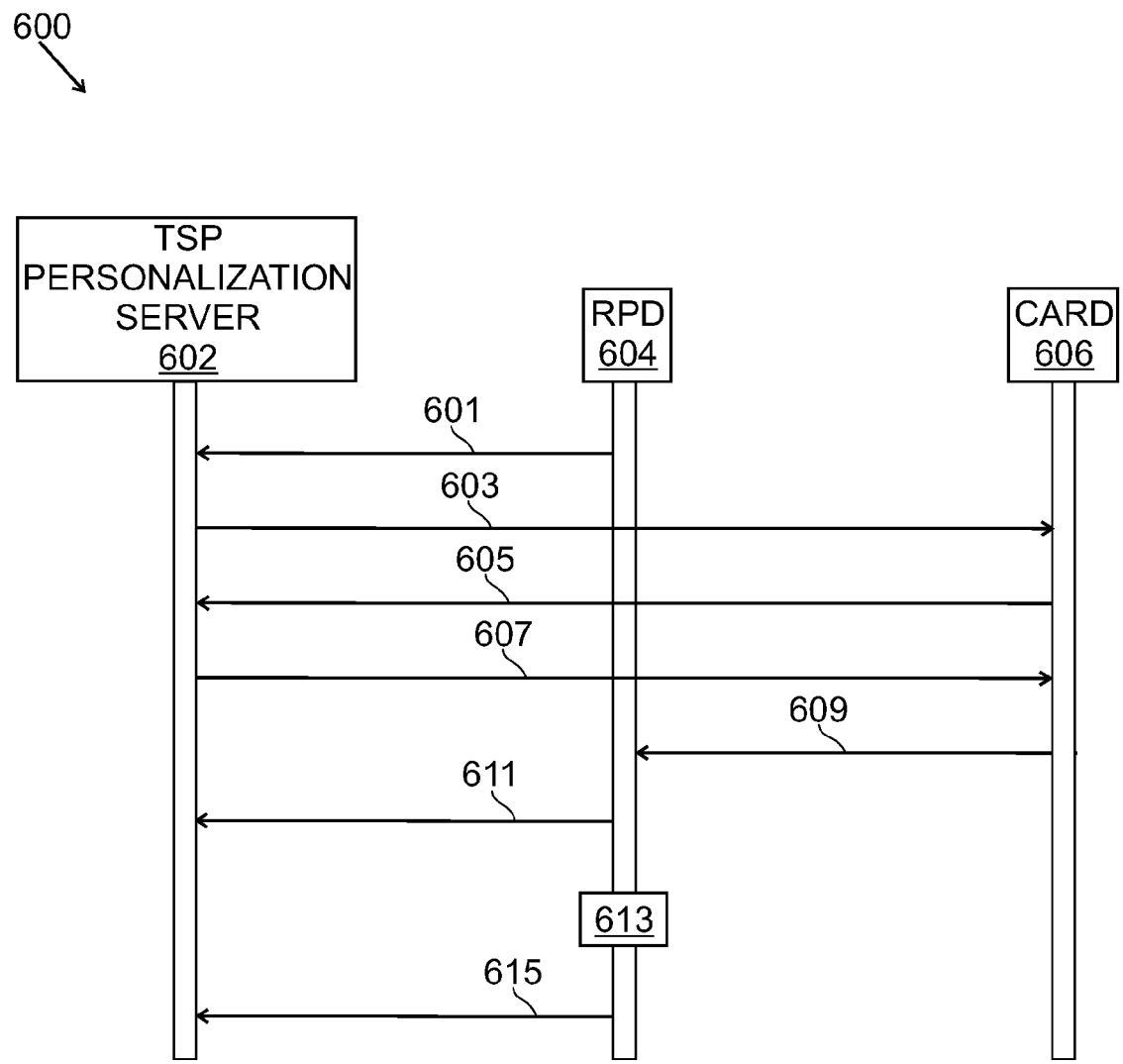
FIG. 6 is a command flow diagram illustrating an embodiment of an RPD personalization process for a payment card having a magnetic stripe in accordance with an embodiment of the invention.

FIG. 6 is a command flow diagram 600 illustrating an embodiment of an RPD personalization process for a payment card having a contact plate. For ease of understanding, the command diagram only includes a TSP Personalization Server 602, the RPD 604 and the card 606 having a contact plate, but in practice (as explained above) a Service Provider Server computer is included between the RPD and TSP Personalization computer. In addition, the system may also include a Hardware Security Token (HST) associated with the RPD and a Hardware Security Module (HSM) associated with the TSP Personalization Server.

Referring again to FIG. 6, the process begins when the RPD transmits 601 a request that a card be personalized to the TSP Personalization Server. In response, the TSP Personalization Server transmits 603 a "GET DATA" command in order to obtain a "device data" which is used to identify which actual device will be personalized. From this information the TSP server computer can determine the Issuers' Master Personalization key (KMC), which is used to protect the card, and the diversification data required to generate the diversified personalization key ($KD_{perso}$). The RPD then transmits 605 the requested data to the TSP Personalization Server, which in concert with the Hardware Security Module (HSM) generates the session keys required to convert (encrypt and Method Authentication code (MAC)) the data from MOTAPS into the necessary number of card Application Process Data Units (APDUs). The personalization data from the TSP Personalization Server is then transmitted 607 directly to the card using the commands necessary to personalize the card. During this process, the card responds 609 with a "9000" response (or other response as determined by its specification) to each command received to acknowledge successful processing, and the RPD confirms 611 to the TSP Personalization Server that the card has been personalized. The RPD also performs 613 any required functions, such as testing the card, enabling the card, and/or loading value on the card, and then issues the card to the consumer. The RPD then confirms 615 to the TSP Personalization Server that the card has been issued.

Figure 7:
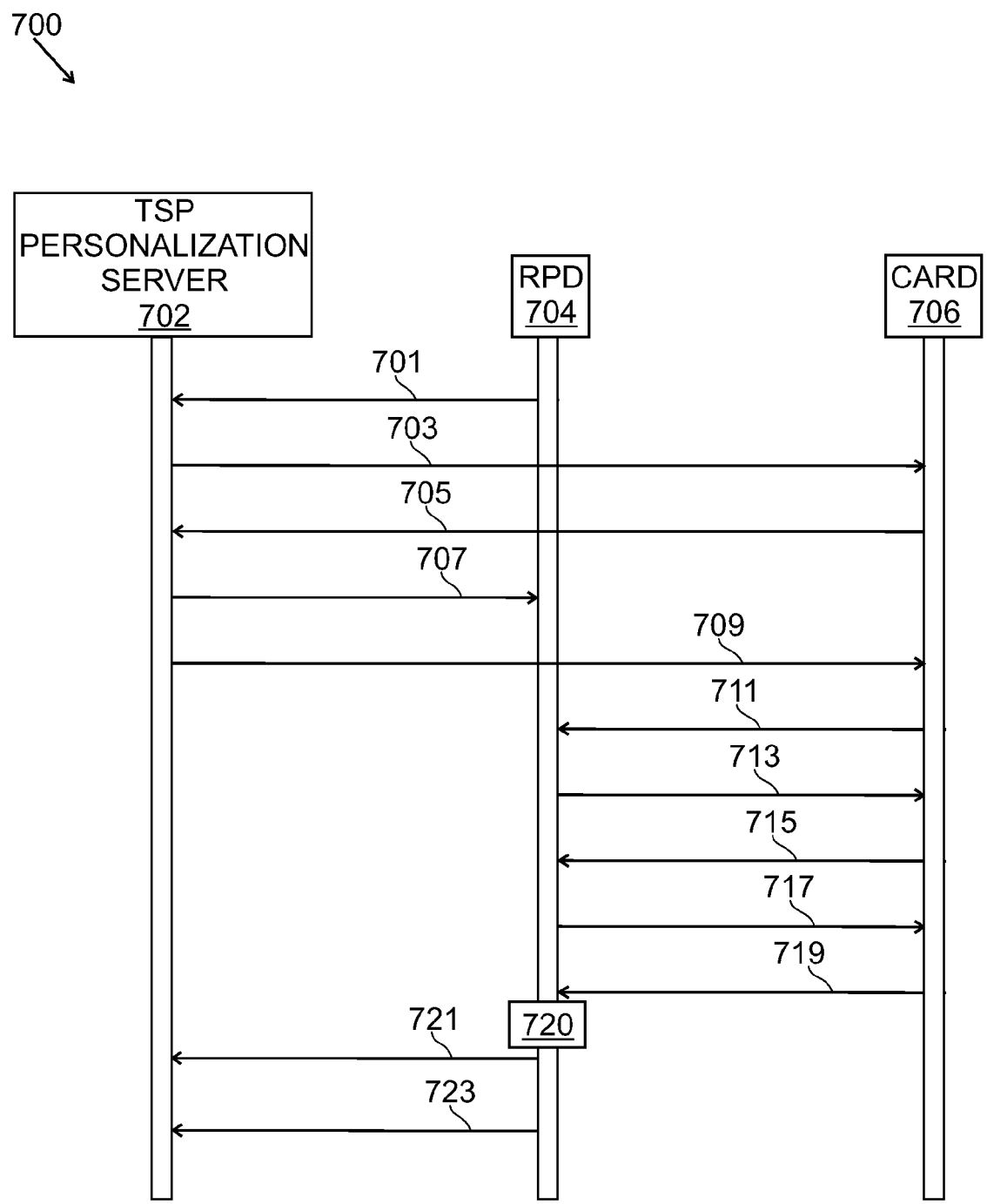
FIG. 7 is a command flow diagram illustrating an embodiment of an RPD personalization process for a proximity payment device in accordance with an embodiment of the invention.

FIG. 7 is a command flow diagram 700 illustrating an embodiment of an RPD personalization process for a proximity payment device 706, which may be a payment card having a proximity circuit or a NCFF proximity device, and is a card conforming to the common personalization specification. For ease of understanding, the command flow diagram only shows a TSP Personalization Server 702, the RPD 704 and the proximity payment card 706, but in practice (as explained above) a Service Provider Server computer is included between the RPD and TSP Personalization Server computer. In addition, the system may include a Hardware Security Token (HST) associated with the RPD and a Hardware Security Module (HSM) associated with the TSP Personalization Server.

Referring again to FIG. 7, the process begins when the RPD requests 701 card personalization from the TSP Personalization Server. The TSP Personalization Server transmits 703 an "INITIALIZE UPDATE" command to switch the proximity device to personalization mode. The command includes a random challenge to the card to which the card responds 705 by switching into personalization mode and returning its own random challenge data. In an embodiment, the TSP Personalization Server receives the data and then uses the Hardware Security Module (HSM) to generate three session keys and the data for the authenticate command. These keys can then be used to encrypt and sign all the MOTAPS data when it is constructed as card APDUs. The random challenges, the Key Data and a Card Sequential counter are used together with the Master Personalization Key (KMC) to derive a personalization session key ($KD_{perso}$). (It should be noted that the use of random values and sequential counters results in generating a personalization key that will change for each personalization session rather than being fixed (as in the case of a PayPass™ magnetic stripe personalization process) for added security.)

Referring again to FIG. 7, the TSP Personalization Server next transmits 707 to the RPD personalization data prepared for the proximity payment device, and transmits 709 an "EXTERNAL AUTHENTICATE" command directly to the proximity payment device to start the personalization session using the calculated session key. The RPD responds 711 with a "9000" response to the RPD, and the RPD then transmits 713 a "STORE DATA" command along with the personalization data (one APDU at a time) to the proximity payment device. (It should be understood that the RPD sends multiple "STORE DATA" commands to the proximity payment device to load the personalization data because there is too much data to use only one command. A parameter is set on the last STORE DATA command 717 to indicate that all personalization data has been sent, and at this time if the correct data has been specified then the card will enter the personalized state.) In response to the first "STORE DATA" command, the proximity payment device transmits 715 a "9000" response, and does so for each APDU received thereafter. The RPD transmits 717 a "FINAL STORE DATA" command when the last of the personalization data is transmitted. After the proximity device transmits 719 its final "9000" response, the RPD transmits 721 a confirmation message to the TSP Personalization Server that the card has been personalized. The RPD then performs 720 any required functions, such as testing the card, enabling the card, and/or loading value on the card before issuance, and when finished then issues the card to the consumer. The RPD then confirms 723 to the TSP Personalization Server that the card has been issued.

The above description and/or the accompanying drawings are not meant to imply a fixed order or sequence of steps for any process referred to herein. Rather, any process described herein may be performed in any order that is practicable, including but not limited to simultaneous performance of steps indicated as sequential. In addition, in some instances steps that are depicted or described herein as being sequential may be performed in parallel in some embodiments.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A system for remotely personalizing payment devices for consumers, comprising:
    a Mobile Over-the-Air Provisioning Service (MOTAPS) server computer;
    a trusted service provider (TSP) personalization server computer operatively coupled to the MOTAPS server computer, the TSP personalization server computer receiving personalization data from the MOTAPS server computer and transmitting personalization data and instructions;
    a hardware security module (HSM) operatively coupled to the TSP personalization server computer;
    an issuer server computer operably coupled to at least one of the MOTAPS server computer and the TSP personalization server computer;
    a service provider server computer operably coupled to the TSP personalization server computer; and
    a remote personalization device (RPD) operably coupled to the service provider server computer, the RPD receiving a request from a consumer to provide a personalized payment device to the consumer;
    and wherein the TSP personalization server:
        receives a personalization request from the RPD via the service provider server computer;
        requests personalization data from the issuer server computer;
        transmits commands to the RPD via the service provider server computer to obtain payment device data to identify an issuers' personalization key and to obtain diversification data for generating a diversified personalization key;
        receives the requested payment device data and diversification data from the RPD via the service provider server computer;
        generates, in concert with the HSM, session keys and converts data from the MOTAPS server computer into a payment device application process data unit (ADDU);
        transmits the ADDU and personalization data via the service provider server computer to the RPD for loading onto a payment device associated with the RPD; and
        receives a response from the RPD via the service provider server computer confirming that the payment device has been personalized.

2. The system of claim 1, wherein the HSM is coupled to the TSP personalization server computer via a dedicated local area network.

3. The system of claim 1, further comprising a hardware security token (HST) operably coupled to the RPD, the HST storing at least one cryptographic key required to authenticate the RPD to the TSP Personalization Server computer.

4. The system of claim 3, wherein the HST further comprises volatile memory for storing the at least one cryptographic key so that a power loss terminates a personalization session.

5. The system of claim 1, wherein the RPD is a kiosk comprising:
    a housing;
    a user interface located on an outside portion of the housing that is accessible to a consumer;
    a card reader operably coupled to the user interface, the card reader also located on an outside portion of the housing that is accessible to a consumer;
    a central processing unit (CPU) within the housing and operably coupled to the user interface and to a communication link, wherein the communication link provides for communications between the CPU and the service provider server computer;
    a hardware security token (HST) operably coupled to the CPU;
    a communication link operably connected to the CPU; and
    a dispenser means for at least one of dispensing a personalized payment device to a consumer or retaining a faulty payment device.

6. The system of claim 5, wherein the dispenser means comprises:
    a payment device reader operably coupled to the CPU;
    a payment device storage and feed mechanism for transporting a stored payment device to the payment device reader;
    a faulty payment device storage bin; and
    a payment device dispenser.

7. The system of claim 5, wherein the CPU and the HST are housed within a secure enclosure within the housing.

8. The system of claim 1, wherein the TSP Personalization server computer is located within a secure hosting facility.

9. The system of claim 1, wherein the RPD comprises at least one of a kiosk, a desk top unit, or an industrial unit for personalizing payment devices in a batch mode.

10. The system of claim 3, wherein the HST supports X509 certificate application to initialize a Secure Socket Layer (SSL) session.

11. The system of claim 3, wherein the HST operates to hold at least on cryptograph in volatile memory such that a personalization session terminates when power is lost.

12. The system of claim 1, wherein the TSP personalization server computer is operated on behalf of a financial institution that issued a payment card account to a consumer.

13. The system of claim 1, wherein the RPD is configured to provide additional services comprising at least one of mobile phone top-up, informational services, advertising, coupon issuing, and coupon redemption.

14. The system of claim 5, further comprising a secure enclosure containing the CPU and the HST within the housing.

15. The system of claim 5, wherein the housing comprises a lockable protective casing that is tamper evident.

16. The system of claim 5, wherein the communications link comprises a mobile telephone link.

* * * * *